United States Patent [19]

Rydström

[11] 4,187,632
[45] Feb. 12, 1980

[54] REMOTE CONTROLLED IMAGE DISPLAY DEVICE

[76] Inventor: Hans F. Rydström, 17, Dannemansvögen, Lidingä, Sweden

[21] Appl. No.: 610,409

[22] Filed: Sep. 4, 1975

Related U.S. Application Data

[63] Continuation of Ser. No. 418,221, Nov. 23, 1973, abandoned.

[30] Foreign Application Priority Data

Nov. 24, 1972 [SE] Sweden .................. 15309/72
Oct. 29, 1973 [SE] Sweden .................. 7314656

[51] Int. Cl.² ......................................... G09F 11/30
[52] U.S. Cl. .................................. 40/446; 40/463; 340/373
[58] Field of Search ............ 40/28 C, 28 R, 37, 39, 40/40, 52 R, 106.54, 446, 447, 463, 614; 340/373

[56] References Cited

U.S. PATENT DOCUMENTS

| | | | |
|---|---|---|---|
| 2,912,674 | 11/1959 | Aiken | 340/44 |
| 3,169,241 | 2/1965 | Aiken | 340/373 |
| 3,319,246 | 5/1967 | Aiken | 340/373 |
| 3,479,759 | 11/1969 | Lattis et al. | 40/37 X |
| 3,516,086 | 6/1970 | Aiken | 340/373 |
| 3,552,048 | 1/1971 | O'Keefe | 40/28 C |
| 3,562,938 | 2/1971 | Salam | 40/28 C |

Primary Examiner—Vance Y. Hum
Attorney, Agent, or Firm—Burns, Doane, Swecker & Mathis

[57] ABSTRACT

A remote controlled image display device includes an assembly of contrast bodies each of which is pivotally mounted for movement between a position of rest and an optionally arrestable position and exhibits to a viewer in combination with a background surface a contrast picture which depends upon which of the two positions the contrast bodies occupy. Movement of the contrast bodies from the rest position to the arrestable position can be effected in various ways such as by means of flexible control threads attached to the bodies, or by use of air jets, and the bodies are held in the arrestable position by releasable electrostatic attractive forces.

2 Claims, 10 Drawing Figures

REMOTE CONTROLLED IMAGE DISPLAY DEVICE

This is a continuation, of application Ser. No. 418,221 filed Nov. 23, 1973, now abandoned.

The present invention refers to an electrically remote controlled image display device with a plurality of contrast elements, each of which comprising a movable contrast body which is arranged to be able to assume two different positions, whereby the contrast bodies, e.g. in combination with a background surface, to viewers expose a contrast that is dependent on said positions.

Image display devices of this kind are previously known through Swedish patent specification 321 173, German DOS 1 566 804, DOS 1 566 805, DOS 2 055 925, and French patent specification 1 442 591.

The device according to Swedish patent specification 321 173 requires that the contrast elements are removed past a position setting station and after this through a display zone. This makes the device complicated, expensive and in need of much maintenance.

In devices according to German DOS 1 566 804, DOS 1 566 805 and DOS 2 055 925, and French patent specification 1 442 591 it is required that the movement of the contrast bodies is effected by electrostatic fields. This is a solution that leads to use of very high voltages and thus has serious draw-backs of a technical as well as economic nature.

An object of the invention is to achieve a device of the kind referred to which is simpler, less expensive and more reliable than the previously known devices and which requires less maintenance. According to the invention, this object is achieved by a device defined in the characterizing portion of patent claim 1.

The basic concept of the invention is to use mechanically simple and rugged means to bring the contrast bodies, for each picture to be displayed, to go through a preferably cyclical motion program, during the course of which each of the contrast bodies is brought within the influence range of an arresting means, based on electromagnetic or preferably electrostatic force, which arresting means is arranged to be controlled by electric remote control signals and which arresting means, when energized, prevents the contrast body from completing the entire motion program, whereas said arresting means in non-energized condition does not prevent the contrast body from completing the entire motion program. When all contrast bodies have gone through their, depending on the activation state of their arresting means, either aborted or completed motion programs, the result is that a picture has been produced on the display device in accordance with the received electric signals. The picture information read-in, i.e. the application of the voltage that is to produce the force field in the different arresting means, preferably is carried out sequentially in a television-like manner, whereas change of picture can be effected simultaneously for all contrast elements, if desired. The advantage of this arrangement is that the period of time during which a given picture is visible to viewers is utilized for reading in information pertaining to the subsequent picture.

It is also possible, however, to use the display device according to the invention for "simultaneous presentation", generally in the same way as when writing on a "black board". In this case all arresting means are energized and all contrast bodies are brought to the arrested position, whereupon the arresting means of those contrast bodies that correspond to the actual position of the "pen", as the position of their coordinates is obtained from the signals, sequentially are de-energized, whereupon these specific contrast bodies complete the final portion of said motion program, thus assuming a contrast that differs from the rest of the contrast bodies. The viewer thus can follow the movements of the "pen" on the "board" and will see a remaining trace after the "pen". Handwriting, block letter writing and picture drawing thus can be carried out in a natural-looking way.

The arresting means in principle can be based on electromagnetic as well as electrostatic force action. The electrostatic type is associated with important advantages, however, among other things from a weight and cost point of view. An electrostatic arresting means does not have to weigh more than between 1 and 10% of the weight of an electromagnetic one, and it is much less expensive to manufacture. In addition, its remanence properties are better, and the energy requirement is low. Since the magnitude of the currents involved is low, the control contacts used probably can be expected to have a longer useful life. Frequently it is desired to make a predetermined picture appear or disappear by means of electric control signals. The picture to be displayed can comprise a great number of fine details and thus would require a very great number of picture elements, if each of these in its entirety could exhibit only a uniform, selectable color. Thus it is desirable to be able to display a picture containing many fine details by means of a small number of contrast bodies. Previously this has been effected by means of Venetian blind type devices which due to their mechanical structure often fail due to wear.

In accordance with the invention, display of a fine details exhibiting, predetermined picture can be effected in a way that is reliable and requires very little maintenance. In a device of the kind specified in the introductory part of this specification, this can be achieved if each of said contrast bodies is arranged to exhibit a fragment of a predetermined picture, wherein said picture fragment may comprise any number of contrast areas of optional shape and color and may be applied either on the contrast body or on the background surface area behind the contrast body. The option of selecting contrast bodies to be released in this embodiment is used by simultaneous passivation of the arresting means of all contrast bodies that are arranged to display a fragment of one and the same picture in order to make that picture appear or disappear, as the case may be. In this embodiment it may be advantageous to give the contrast bodies the shape of oblong strips, each turnable around a longitudinal axis of its own.

If it is desired to be able to select one of a few alternative, predetermined pictures, or if it is desired to display a dot screen type of picture in a plurality of colors, it is possible in accordance with the invention to arrange the contrast bodies to be able to assume e.g. three different positions and in each one of these positions to exhibit either a fragment of a specific, predetermined picture or a specific color.

An especially simple, inexpensive and reliable setting means in accordance with an embodiment of the invention can be achieved if said setting means include devices whereby the contrast bodies by means of an air stream can be brought to their selectively arrestable positions or to positions in the vicinity of their selectively arrestable positions.

Under certain circumstances an electrostatic arresting means when de-energized may have a tendency to continue keeping its contrast body attracted during an unacceptably extended period of time, probably due to the dielectric material being polarized, thus acting as an electret. A contributory cause for the time delay in question may be of an aerodynamic nature. When very short-time passivation of the arresting means is used for controlling the contrast bodies, an irreversible movement must have been initiated before the activation voltage will reappear. It has been found possible in a simple way to eliminate excessive delay and to obtain distinct and irreversible release of contrast bodies equipped with electrostatic arresting means, if in accordance with an embodiment of the invention at least one spacing wart is provided between the electrodes, preferably of a height of at least 0.2 mm. By making the spacing wart and/or one of the electrodes resilient, it is possible in accordance with one embodiment of the invention to store potential mechanical energy which upon disappaearance of the voltage between said electrodes will act as repulsion energy to "push off" the movable electrode (the contrast body) from the fixed electrode in spite of such electret phenomenon as may manifest itself. The spacing wart then will give the contrast body a flying start for its transition from the selectively arrestable position to said second position, in direction from the range within which it can be reattracted by the fixed electrode when the voltage reappears, and thus very short pulses can be used without any risk of failure to release even if the mass of the contrast body is relatively large. In addition, due to the air gap caused by the spacing wart, the time lag attributable to aerodynamic effects also is reduced in a considerable degree, since the air is able to enter relatively swiftly into the space between the electrodes right from the start of the movement.

In the following, the invention will be described more in detail with reference to the accompanying drawings with FIGS. 1–10.

Figure 1:
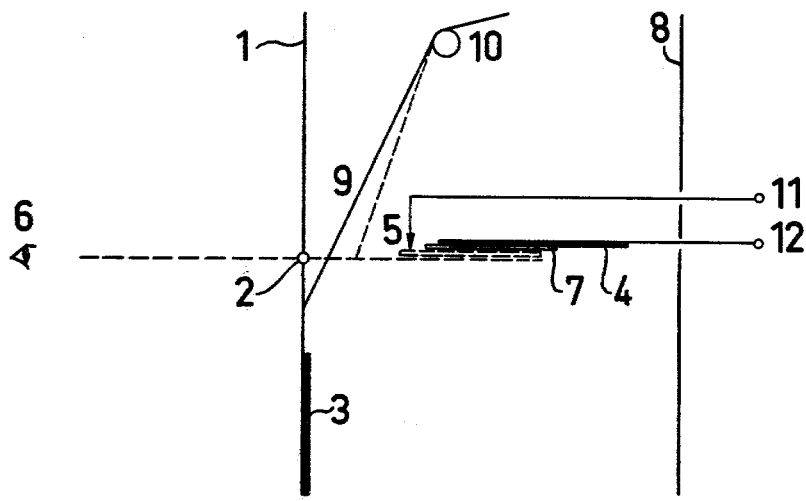
FIG. 1–4 show contrast bodies of different types.

In FIG. 1, 1 is a plane white disk which is low-friction pivoted on a shaft 2. The disk is provided with a plane electrode 3. A fixed electrode 4 and a contact 5 are arranged approximately on the same level as the shaft 2 and behind the latter as seen from a viewer 6. Beneath the disk 1 there is a black background screen 8. A flexible control thread 9 is secured to the disk 1 at some distance below the shaft 2 and is directed in an oblique angle upwards. Via a pulley 10 the thread is brought to a pulling device (not shown). The center of gravity of the disk including the affixed electrode 3 is located directly below the shaft, and thus the solid-line position in FIG. 1 is an equilibrium position due to gravity. Contact 6 and the fixed contact 4 are connected to terminals 11 and 12, respectively.

The mode of operation of the device shown in FIG. 1 is as follows.

By means of the thread 9 it is possible to pivot the disk 1 around the shaft 2 to make the electrode 3 on the disk come close to the fixed electrode 4. In this process, the electrode will touch the contact 5, but, due to the insulating sheet 7, will not touch the fixed electrode 4. If a voltage is applied between electrodes 3 and 4, these will attract each other. If the tension of the thread 9 is eliminated, the disk 1, although its center of gravity is no longer directly below the point of suspension (shaft 2), will remain in the dashed-line position, and thus the viewer 6 will not see the white disk 1 or at any rate only a small portion of it, but will see the black background screen 8 behind it. Now if the voltage between electrodes 3 and 4 is made to disappear, the disk 1 due to gravity and the eccentric position of the center of gravity will return to the solid-line position, and thus the viewer instead of the black background screen 8 will see the white disk 1. On the other hand, if the same program is repeated without any voltage being applied between the elctrodes, the elimination of thread tension immediately will cause return to the stable vertical position. If now the applied voltage is derived from a picture information carrying signal, each picture element selectably can be displayed dark or light.

Figure 2:
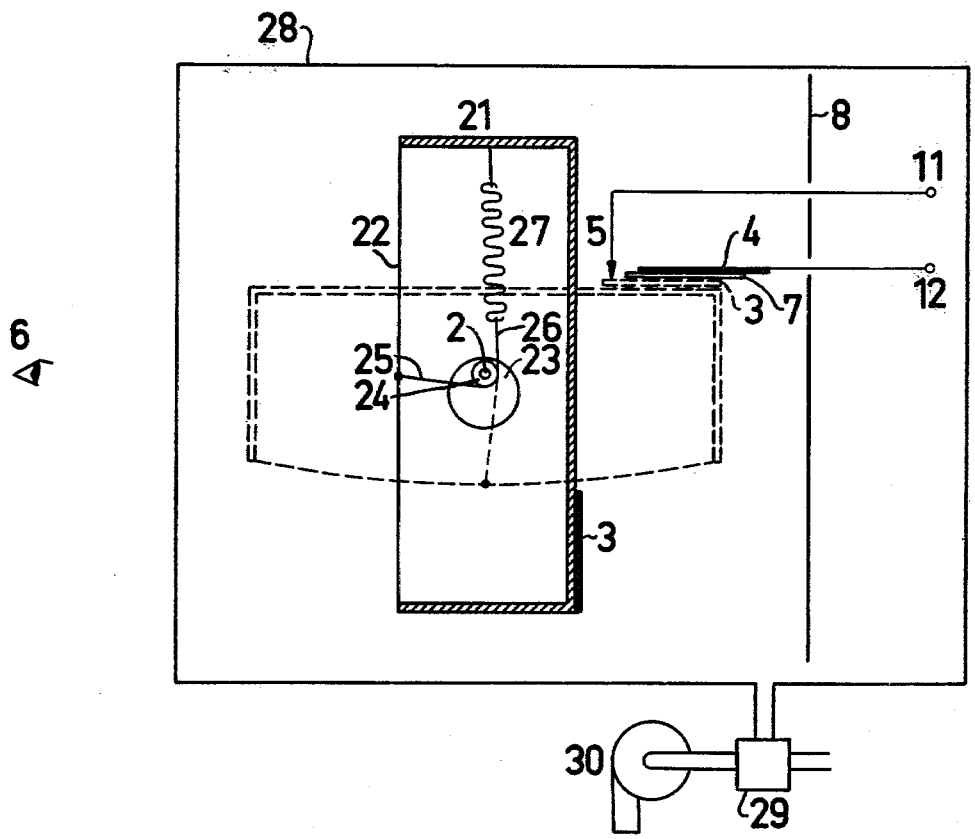

FIG. 2 illustrates another variant of a contrast body in accordance with the invention. A black container 21 with a white, flexible lid 22 and containing air of atmospheric pressure is low-friction pivoted on a shaft 2 which extends right through the container 21. On the shaft within the container 21 is pivoted an eccentric center of gravity exhibiting rotor 23, which has a portion 24 that is concentric with the shaft. A first thread 25 in its one end is secured to the rotor 23 and is wound around the part of the rotor that is coaxial with the shaft and in its other end is secured to the center of the flexible lid 22. A second thread 26 is secured to the rotor 23 and is wound on the concentric portion of the rotor and in its other end is secured to a helix spring 27, which in turn is secured to the wall of the container 21. As a consequence of the rotor having an eccentric center of gravity, the contrast body has an equilibrium position which is the solid-line position in FIG. 2. On the bottom of the container there is an electrode 3. Behind the container 21, with respect to a viewer 6, there is a fixed, horizontal electrode 4 and beneath the latter is an insulating sheet 7. Behind the fixed electrode there is a black background screen 8. The entire contrast body is contained in a hermetic housing 28, which is transparent, at least towards the viewer, which housing via a selector valve 29 can be connected either to a negative-pressure source e.g. a vacuum pump as illustrated 30 or to the ambient atmosphere.

The device according to FIG. 2 in principle operates in the same way as the device shown in FIG. 1, but items 1, 9 and 10 and said pulling device are replaced by items 22–30, where items 28–30 are common to the entire display device. Pulling of the thread 9 now corresponds to the pressure within the housing 28 being reduced below atmospheric by means of the negative-pressure source 30 and the selector valve 29 which functions, as illustrated, to selectively connect the interior of housing 28 with the ambient atmosphere or with the intake side of the vacuum pump 30. The flexible lid 22 then will bend outwards due to the air confined in the container 21 and will pull the thread 25, with the result that the eccentric rotor 23 against the force exerted by the spring 27 will turn to shift the center of gravity of the rotor to a position closer to the lid. As a consequence hereof, the contrast body 21, 22 will assume a new position, shown in broken lines in FIG. 2, in which position the lid 22 is essentially horizontal and the electrode 3 is adjacent to the insulating sheet 7 that is beneath the electrode 4. Now if the valve 29 is switched to make the pressure within the housing 28 return to the ambient atmospheric pressure, the bulge of the lid 22 will disappear, and the spring 27 will return the eccentric rotor 23 to the solid-line position in FIG. 2. Return to this position will not take place, however, if there is a voltage between terminals 11 and 12. Because in this case the contact 5 will be in contact with the electrode 3 and thus there will be a voltage between electrodes 3 and 4. The attraction force between these electrodes will preclude the return. Whether the viewer after the motion program is completed will see the white lid 22 or the black container 21 and the black background screen 8 thus depends on whether there is (was) any voltage between terminals 11 and 12 or not.

Figure 3:
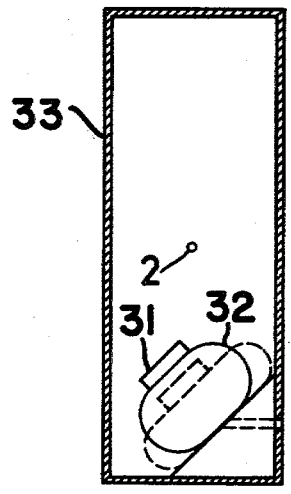

The embodiment shown in FIG. 3 in principle works in the same way as the embodiment according to FIG. 2, but shifting of the center of gravity position in an oblique direction with respect to the direction of the main dimension of the container is effected by moving a mass 31 (having the same gravity shifting function as eccentric rotor 23 of FIG. 2) which is secured to an elastic bladder 32, accomodated within the container 33 and communicating with the ambient atmosphere, the moving of said mass being brought about by the pressure in the container deviating from the ambient pressure; in this context "ambient pressure" means the pressure within the housing 28 of FIG. 2 (not shown in FIG. 3).

Figure 4:
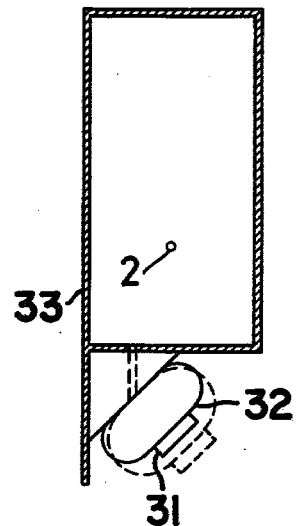

The variant shown in FIG. 4 differs from the device according to FIG. 3 only in that the bladder 32 is located external to the container and is communicating with the inner of the container.

In order to achieve the desired equilibrium position, suitable weights can be affixed to the container.

Figure 5:
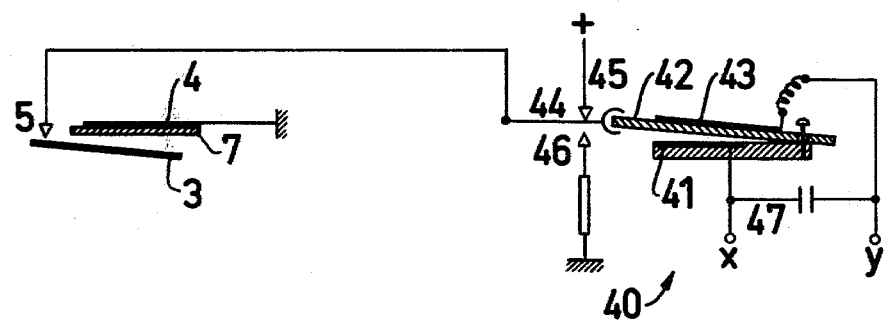
FIG. 5 is a diagram of a device for sequential actuation of the arresting means of selected contrast elements.

FIG. 5 shows a device by means of which it is possible to control the contrast elements selectively by means of an incoming signal. Of the contrast element itself only electrodes 3 and 4, the contact 5 and the insulating sheet 7 are shown. A control relay 40 comprises a fixed y electrode 41, an x electrode 43 which is secured to a movable insulating sheet 42, a contact spring 44 operated by the movable sheet 42, a break contact 45 and a make contact 46. Between electrodes 41 and 43 a capacitor 47 is connected. The contact 45 is connected to a potential that is positive with respect to ground. The contact 46 is connected to ground via a resistor. The contact spring 44 is connected to the contact 5. The electrode 4 is connected to ground. All y electrodes pertaining to one and the same contrast element row are connected to a common y lead, and all x electrodes pertaining to one and the same contrast element column are connected to a common x lead.

The mode of operation of the device according to FIG. 5 is as follows. All contrast bodies in the display device in the manner described above are brought to the position in which the movable electrode 3 is adjacent to the fixed electrode 4. In this position, electrode 3 will be in contact with the contact 5 and will assume positive voltage through contact spring 44 and contact 45. As a consequence, it will be held attracted by the grounded electrode 4, and so the contrast body will be arrested in the position in which the viewer cannot see its white surface. The entire display surface thus appears black. Now, if it is desired to change the contrast of a certain contrast element, a positive voltage pulse is fed to the x lead of the column in which this element is located, and at the same time a negative voltage pulse is fed to the y lead of the row in which the element in question is located. Only this intended element then will obtain voltage between its x electrode and its y electrode, and thus this element's "armature" (sheet 42 and electrode 43) will be attracted. Contact spring 44 then will switch over from contact 45 to contact 46, causing the voltage between electrodes 3 and 4 to drop to zero or, in any case, to a value that is insufficient for retaining the contrast body. Under influence of the force of gravity, the contrast body then will switch over to the position in which the white surface (1, 22) is visible to the viewer, and will remain there until next time it is operated on by the setting means (9, 10; 22-30). The purpose of the capacitor is to store energy for retaining the armature for a period of time that is sufficient to make sure the contrast body will be released even if short pulses are used on the x and y leads.

Application of pulses to desired x and y leads is carried out using methods that are well-known to anyone skilled in the art and thus do not need to be described here.

Figure 6:
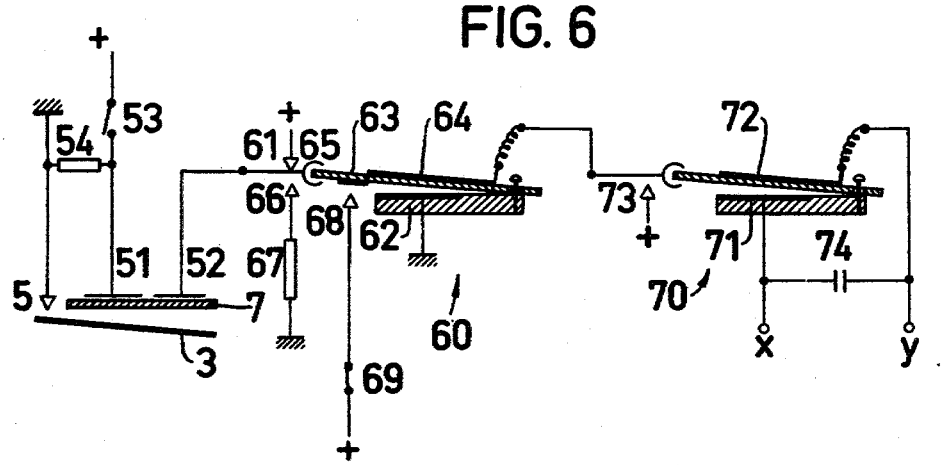
FIG. 6 is a diagram of a device for series read-in and parallel display.

The device shown in FIG. 6 is intended for use when it is desired to read in picture information for one picture while another, previously read-in picture is visible to the viewer. The electrode arrangement at the contrast body is identical to the one described above with respect to the moving electrode 3 and the contact 5, but the fixed electrode is replaced by two electrodes, 51 and 52, the former of which being connected to plus potential through a switch 53 and to ground through a resistor 54, and the latter of which being connected to a movable contact 61 of an electrostatic memory relay 60, which has a grounded fixed electrode 62 and a movable insulating sheet 63 with an electrode 64. The movable contact 61, which is actuated by the sheet 63, in the de-energized position via a contact 65 is connected to plus potential, and in the energized position via a contact 66 is connected to ground via a resistor 67. The movable electrode 63 in the energized position is connected to a contact 68 which via a switch 69 can be connected to plus potential. Finally there is an electrostatic read-in relay 70 which similarly to relay 40 has an x electrode 71 and an y electrode 72, which electrodes are connected as for relay 40 and which operate a make-contact 73, which is insulated from the electrodes of the relay and which in the energized position connects the plus potential to electrode 64 in memory relay 60. In the same way as for relay 40, a capacitor 74 is connected between electrodes 71 and 72.

The mode of operation of the device according to FIG. 6 is as follows. Like relay 40, relay 70 will be energized if different potentials are applied simultaneously to its x electrode 71 and its y electrode 72. A positive voltage then will be applied to electrode 64 in relay 60, and thus the armature (sheet 63 with electrode 64) will be attracted, and as a consequence electrode 64 will be connected to contact 68. Through the closed switch 69, self-holding voltage will be applied to the moving electrode 64 of relay 60. This operation is carried out sequentially for all contrast elements that are to exhibit a white surface. The just described setting of relays 60 can be carried out while viewers look at a previously read-in picture. At the moment when change of picture is to be carried out, the contrast bodies are operated on by the setting means to bring the electrodes 3 of all contrast elements close to electrodes 51 and 52. At this time, the switch 53 is open, and thus electrodes 51 are inactive. The contrast elements whose memory relays are energized have ground potential on electrode 52 via contact 66 and resistor 67. Since both electrodes 3 and 52 are at ground potential, there will be no attraction force between them. Those contrast elements whose memory relays are de-energized, however, have plus potential on electrode 52, and thus electrodes 3 and 52 attract each other, with the result that these contrast bodies will be arrested in the "black position". The setting means now return to their original condition, with the consequence that the non-arrested contrast bodies will exhibit their white surface, whereas the arrested ones show their black surface and the black screen 8 behind them. In order to make the memory relays accessible for new information read-in, switch 53 now will be closed, which causes retaining of all contrast bodies that are in the "white position", whereas the ones in the "black position" will not be affected, since they are not connected to ground through contact 5. (Even if they were thus connected, the great distance would preclude affection). After this, switch 69 is opened, and thus the self-holding is discontinued for all of the memory relays. The voltage then disappears from electrodes 52, and the contrast bodies that are in the "white position" now are retained exclusively by electrodes 51. The information receiving means (memory relay 60) now are free to receive information concerning the next picture while the presented picture can be seen by the viewer. Change of picture then is carried out in the manner described above.

Figure 7:
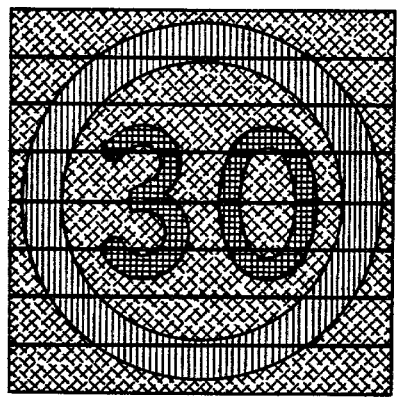
FIG. 7 shows a road sign which by means of electric signals is to be made visible or invisible to road-users.

FIG. 7 shows a speed limit sign which is divided into horizontal strips and which is supposed in response to electric signals to display either speed limit "30" or a neutral, e.g. gray surface. An additional requirement, dictated by security considerations, is that in case of power failure the sign should display speed limit "30". In accordance with an embodiment of the invention this can be achieved by means of the device illustrated in FIG. 8.

Figure 8:
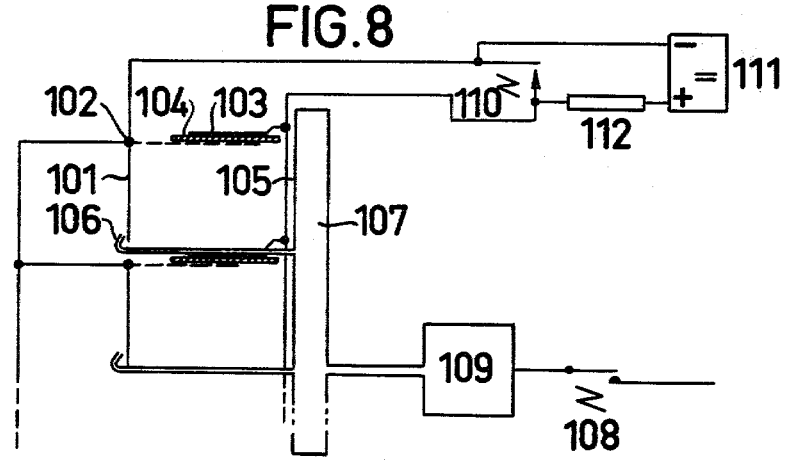
FIG. 8 shows how this can be carried out with a minimum of moving parts by means of an embodiment of the invention.

A number of metal strips 101, of which only two are shown in FIG. 8, are low-friction pivoted around a shaft 102 in front of a gray background surface 105. Each strip carries an oblong rectangular fragment of the sign to be displayed. Behind each strip 101 at the same level as its shaft 102 there is an insulation sheet 104 and on top of this a metal electrode 103. The shafts are electrically interconnected and connected to the minus terminal of a voltage source 111. The electrodes 103 likewise are interconnected and via a high resistance resistor 112 are connected to the plus terminal of said voltage source 111. A relay 110 with a closing contact is arranged to close a current path from the interconnected electrodes 103 to the electrically interconnected shafts 102. For each strip 101 there is an obliquely upwards directed nozzle 106 communicating with an overpressure chamber 107. This chamber in turn is connected to a pressure source 109 which is arranged to be actuated by a relay 108.

If it is desired that the sign displays a uniformly gray surface, a signal is made to actuate relay 108, with the result that the pressure source 109 during a short period of time causes an overpressure in the overpressure chamber 107, which in turn results in an air jet emerging from each one of the nozzles for a corresponding short period of time 106. This air jet will impinge upon and cause the strips to be swung upwardly about their respective horizontal pivotal axes from a depending rest position to their optional horizontal arrestable position adjacent to the insulating sheet 104. The voltage source 111, which is presumed to be in continous operation, will apply voltage between the electrodes and their associated strips, and thus the strips 101 will adhere to said sheets 104 due to electrostatic attraction, and this is the case even after the brief air jet has disappeared. The viewer now will see only the gray background surface 105. Now, if it is desired that the sign be visible, a signal is made to actuate relay 110. A discharge current path then is closed between shafts 102 and electrodes 103, and thus the strips 101 due to gravity return to the solid-line position in FIG. 2. This position is occupied until next time the overpressure source 109 is actuated. In case of power failure, the same effect is obtained as when relay 110 is actuated, i.e. the sign "30" is displayed in compliance with the safety requirement referred to above.

Figure 9:
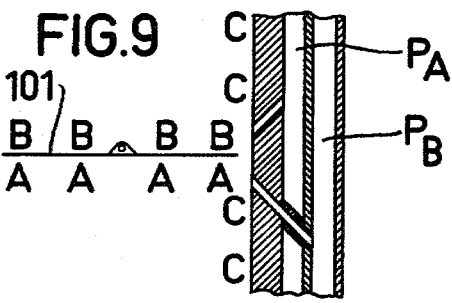
FIG. 9 shows an embodiment of a contrast element with three positions.

FIG. 9 shows a contrast body which is able to assume three optional positions. In the horizontal position, which in this case is assumed to be an equilibrium position due to gravity, the viewer will see the background screen, i.e., the portion of the background surface marked C. The contrast body on the bottom side is marked A and on the top side is marked B in FIG. 9. Behind the background screen there are two pressure chambers, $P_A$ and $P_B$, and each of these is communicating with a nozzle (hole aperture) in the vicinity of the part of the contrast body closest to the background surface. By pressurizing pressure chamber $P_A$ it is possible by means of an obliquely downwards directed air jet to achieve that the contrast element while obscuring background surface C will exhibit the A-marked side of its contrast body, and by pressurizing pressure chamber $P_B$, on the other hand, it is possible by means of an obliquely upwards directed air jet to achieve that the contrast element while obscuring background surface C will exhibit the B-marked side of the contrast body according to FIG. 9. In order to make the figure more distinct, the electrodes (one for the A-displaying position and one for the B-displaying position) have been omitted, but in principle they are arranged as in FIG. 8.

Figure 10:
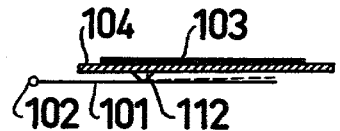
FIG. 10 shows a device to insure that a desired release of a contrast body is carried out even if short control pulses are used.

The designations in FIG. 10 as far as applicable are in agreement with those in FIG. 8. On the insulating sheet 104 is provided an insulating spacing wart 112 that will serve as abutment when the contrast body is in the selectively arrestable position and the purpose of which is to minimize the release time delay due to electret phenomena and aerodynamic factors. A dashed line indicates a position that is obtained if the contrast body is made of thin, resilient material. The energy stored in the resilient material in this position will be released in the form of a repulsion impulse in case the attraction force disappears as a consequence of the voltage being eliminated, i.e. when release and return to rest position is supposed to take place. Obviously, the resilience could as well be provided in the spacing wart itself or in the "fixed" electrode (or the insulating sheet covering the latter).

The description given above refers only to illustrative embodiments of the invention. Within the scope of said invention many modifications are possible. The setting means thus can be of a variety of types. In principle, any kind of motion provoking device can be used, provided that the force acting on the contrast body during return movement is not greater than that an energized arresting device with certainty can prevent its return until the arresting device is de-energized. Examples of feasible setting means arrangements are friction exhibiting bearings for the contrast bodies on a shaft with a programmed reciprocating pivoting movement, turbine with fixed air jet and rotatable vane wheel, reaction turbine operation, electromagnetic operation, operation by means of permanent magnets secured to the contrast bodies and either fixed electromagnets or movable permanent magnets that are arranged external to the contrast bodies.

The movement of the contrast body has been described as a rotational movement, but other types of movement are possible too, e.g. translation movement or a combination of rotation and translation.

Shifting of the position of the center of gravity of the contrast bodies can be effected also by internal-pressure controlled transport of matter in liquid form. An additional possibility of shifting the position of the center of gravity is that two weights are made to make linear movements, one of said weights being secured to the lid 22 and the other one by means of a thread and a pulley being made to move in a plane parallel to the lid (i.e. to the white contrast surface).

The arresting means possibly can comprise a mechanical locking device, e.g. a catch, which is operated by means of an electrostatic or an electromagnetic field.

The container preferably exhibits a leaking path with relatively large flow resistance, whereby pressure variations due to varying barometric pressure are equalized. Suitable time constant is of the order of several minutes.

What is claimed is:

1. An electrostatically controlled visual display device comprising, in combination:

a contrast body having an electrically conductive portion and mounted for movement between a rest position and an optionally arrestable position, said contrast body comprising a planar member mounted for movement about a pivotal axis and exhibiting to a viewer a contrast which depends upon which of the said positions it occupies;

impelling means optionally operable for bringing said contrast body from its rest position to its optionally arrestable position, said impelling means comprising a compressed air source, an on-off control for said compressed air source and a nozzle positioned adjacent a surface of said contrast body for directing a jet of the compressed air against said surface for a short period of time;

electrostatic arresting means sufficient to retain said contrast body in said optionally arrestable position after being brought to said optionally arrestable position by said impelling means, said electrostatic arresting means comprising a fixed electrode and a movable electrode constituted by said electrically conductive portion of said contrast body which is brought into a position adjacent to but spaced from said fixed electrode to establish an electrostatic attractive force therebetween; and means optionally operable for energizing and de-energizing said electrostatic arresting means comprising a voltage source to which said fixed and movable electrodes are connected through a charging resistor and relay controlled switch means for closing a discharge path directly between said electrodes and which serves to eliminate the electrostatic attractive force therebetween, said contrast body being self-restorable to its rest position when said electrostatic arresting means is in its de-energized state.

2. An electrostatically controlled visual display device comprising, in combination:

a contrast body having an electrically conductive portion and mounted for movement between a rest position and an optionally arrestable position, said contrast body comprising a planar member mounted for movement about a pivotal axis and exhibiting to a viewer a contrast which depends upon which of the said positions it occupies;

impelling means optionally operable for bringing said contrast body from its rest position to its optionally arrestable position, said impelling means comprising a compressed air source, an on-off control for said compressed air source and a fixed nozzle positioned adjacent a surface of said contrast body which directs a fine jet directly at a region of said surface that is located eccentrically with respect to said pivotal axis;

electrostatic arresting means sufficient to retain said contrast body in said optionally arrestable position after being brought to said optionally arrestable position by said impelling means, said electrostatic arresting means comprising a fixed electrode and a movable electrode constituted by said electrically conductive portion of said contrast body which is brought into a position adjacent to but spaced from said fixed electrode to establish an electrostatic attractive force therebetween; and means optionally operable for energizing and deenergizing said electrostatic arresting means comprising a voltage source to which said fixed and movable electrodes are connected through a charging resistor and relay controlled switch means for closing a discharge path directly between said electrodes and which serves to eliminate the electrostatic attractive force therebetween, said contrast body being self-restorable to its rest position when said electrostatic arresting means is in its de-energized state.

* * * * *